(12) United States Patent
Takaki et al.

(10) Patent No.: US 10,209,503 B2
(45) Date of Patent: Feb. 19, 2019

(54) FLUORESCENCE MICROSCOPE LIGHT SOURCE APPARATUS AND FLUORESCENCE MICROSCOPE

(71) Applicant: USHIO DENKI KABUSHIKI KAISHA, Tokyo (JP)

(72) Inventors: Ryohei Takaki, Tokyo (JP); Kiyoyuki Kabuki, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 23 days.

(21) Appl. No.: 15/695,464

(22) Filed: Sep. 5, 2017

(65) Prior Publication Data

US 2018/0067295 A1 Mar. 8, 2018

(30) Foreign Application Priority Data

Sep. 7, 2016 (JP) ................................. 2016-174199

(51) Int. Cl.
*G02B 21/06* (2006.01)
*G01J 3/12* (2006.01)
(Continued)

(52) U.S. Cl.
CPC ................ *G02B 21/06* (2013.01); *F21K 9/64* (2016.08); *G01J 1/58* (2013.01); *G01J 3/024* (2013.01);
(Continued)

(58) Field of Classification Search
CPC .......... G02B 21/06; G02B 21/08; G02B 6/00; G02B 19/00; F21K 9/64; F21K 9/61;
(Continued)

(56) References Cited

U.S. PATENT DOCUMENTS 5,734,498 A * 3/1998 Krasieva ................ G02B 21/06
359/368
9,581,314 B2 * 2/2017 Wang ...................... F21V 13/08
(Continued)

FOREIGN PATENT DOCUMENTS

JP 2015-510250 A 4/2015
WO 2013/138191 A1 9/2013

*Primary Examiner* — Frank G Font
(74) *Attorney, Agent, or Firm* — Studebaker & Brackett PC (57) ABSTRACT

Disclosed are a fluorescence microscope light source apparatus and a fluorescence microscope capable of obtaining high-luminance light in a wavelength of 500 to 550 nm and having reduced background noise when a sample is observed. The fluorescence microscope light source apparatus to be installed in a fluorescence microscope including an illumination light bandpass filter includes: a laser diode that emits blue light as excitation light; a phosphor that converts the excitation light from the laser diode into illumination fluorescence with a wavelength region of 500 to 550 nm; an optical system that extracts the illumination fluorescence from the phosphor; a first condenser lens that condenses the excitation light onto the phosphor; a light guide body having one end face on which the illumination fluorescence is incident and the other end face from which the illumination fluorescence exits; and a second condenser lens that condenses the illumination fluorescence onto the one end face of the light guide body. A band-elimination filter that blocks or attenuates light, out of the illumination fluorescence, in a wavelength region including a transmission maximum wavelength and including no transmission minimum wavelength in the illumination light bandpass filter is provided on a light path of the illumination fluorescence.

4 Claims, 5 Drawing Sheets

(51) Int. Cl.
*F21K 9/64* (2016.01)
*G01J 3/02* (2006.01)
*G01J 1/58* (2006.01)
*G01J 3/10* (2006.01)
*G01J 3/44* (2006.01)
*G02B 6/00* (2006.01)
*G02B 19/00* (2006.01)

(52) U.S. Cl.
CPC ............ *G01J 3/0208* (2013.01); *G01J 3/0227* (2013.01); *G01J 3/0243* (2013.01); *G01J 3/10* (2013.01); *G01J 3/12* (2013.01); *G01J 3/4406* (2013.01); *G01J 2003/1213* (2013.01); *G02B 6/00* (2013.01); *G02B 19/00* (2013.01)

(58) Field of Classification Search
CPC .......... G01J 1/58; G01J 3/0208; G01J 3/0227; G01J 3/024; G01J 3/0243; G01J 3/10; G01J 3/12; G01J 3/4406; G01J 2003/1213; G01J 2003/1226
USPC .................................................. 359/385, 389
See application file for complete search history.

(56) References Cited

U.S. PATENT DOCUMENTS

| | | | |
|---|---|---|---|
| 2009/0040754 A1* | 2/2009 | Brukilacchio | A61B 1/0653 362/228 |
| 2011/0279039 A1* | 11/2011 | Kishimoto | H05B 33/0803 315/113 |
| 2012/0106186 A1* | 5/2012 | Kishimoto | C09K 11/0883 362/510 |
| 2015/0009315 A1* | 1/2015 | Fukutake | G02B 21/06 348/79 |
| 2016/0312980 A1* | 10/2016 | Wang | F21V 13/08 |
| 2017/0293066 A1* | 10/2017 | Van Bommel | F21K 9/64 |
| 2018/0045943 A1* | 2/2018 | Kobayashi | G02B 21/088 |

* cited by examiner

FLUORESCENCE MICROSCOPE LIGHT SOURCE APPARATUS AND FLUORESCENCE MICROSCOPE

TECHNICAL FIELD

The present invention relates to a fluorescence microscope light source apparatus and a fluorescence microscope.

BACKGROUND ART

As examples of a conventional light source to be installed in a fluorescence microscope, may be mentioned discharge lamps such as a short-arc ultrahigh pressure mercury lamp, a metal halide lamp and a xenon lamp. In addition, from the viewpoint of energy saving, downsizing of a device, increasing life of a light source and the like in recent years, using a solid light-emitting element such as a light-emitting diode as a light source has been proposed (see Patent Literature 1).

When solid light-emitting elements are used as light sources, however, a solid light-emitting element that emits light with a wavelength of 500 to 550 nm, out of three types of solid light-emitting elements that emit red, green and blue light, cannot provide high luminance at present. Thus, it is difficult to obtain sufficient brightness in the field of view of the fluorescence microscope.

In view of such circumstances, a light source apparatus including an excitation light source such as a laser diode and a phosphor that emits fluorescence with a wavelength of 450 to 650 nm upon the receipt of excitation light (for example, light with a wavelength of 440 to 470 nm) from the excitation light source is employed in place of the solid light-emitting element that emits light with a wavelength of 500 to 550 nm.

Moreover, the fluorescence microscope is provided with a bandpass filter that selectively transmits light in a wavelength region of 460 to 550 nm, for example, in order to irradiate a fluorescent dye used for observing a sample only with light in the excitation wavelength region of such a fluorescent dye.

However, it has been found out that problems as described below arise when such a light source apparatus is employed as a light source apparatus installed in a fluorescence microscope.

A fluorescent dye having an excitation wavelength region of 450 to 600 nm and a fluorescence wavelength region of 500 to 650 nm is widely employed as the fluorescent dye used for observing a sample in the fluorescence microscope. On the other hand, Ce:LuAG, for example, is known as the phosphor that emits fluorescence with a wavelength of 450 to 650 nm. The fluorescence wavelength region of such Ce:LuAG is a wavelength region of 470 to 620 nm. When the fluorescence spectrum of the phosphor is shifted to a longer wavelength side than the excitation spectrum of the fluorescent dye as just described, a spectrum represented by the product of the spectrum of light irradiated onto the fluorescent dye and the excitation spectrum of the fluorescent dye (hereinafter referred to as a "sensitive spectrum") is shifted to a longer wavelength side than the excitation spectrum of the fluorescent dye. Consequently, a wavelength region in which the sensitive spectrum and the fluorescence spectrum of the fluorescent dye overlap with each other is increased, thus disadvantageously increasing background noise when a sample is observed.

CITATION LIST

Patent Literature
  Patent Literature 1: Japanese Translation of PCT International Application Publication No. 2015-510250

SUMMARY OF INVENTION

Technical Problem

The present invention has been made in view of the foregoing circumstances and has as its object the provision of a fluorescence microscope light source apparatus capable of emitting high-luminance light in a wavelength of 500 to 550 nm and having reduced background noise when a sample is observed and a fluorescence microscope including such a fluorescence microscope light source apparatus.

Solution to Problem

According to the present invention, there is provided a fluorescence microscope light source apparatus to be installed in a fluorescence microscope which includes an illumination light bandpass filter and in which a sample is illuminated with light with a wavelength of 500 to 550 nm having transmitted through the illumination light bandpass filter. The fluorescence microscope light source apparatus includes:

a laser diode configured to emit blue light as excitation light;

a phosphor configured to convert the excitation light emitted by the laser diode into illumination fluorescence with a wavelength region of 500 to 550 nm;

an optical system configured to extract the illumination fluorescence emitted by the phosphor;

a first condenser lens configured to condense the excitation light onto the phosphor;

a light guide body having one end face on which the illumination fluorescence is incident and the other end face from which the illumination fluorescence exits; and a second condenser lens configured to condense the illumination fluorescence onto the one end face of the light guide body. A band-elimination filter configured to block or attenuate light, out of the illumination fluorescence, in a wavelength region including a transmission maximum wavelength and including no transmission minimum wavelength in the illumination light bandpass filter is provided on a light path of the illumination fluorescence.

In the fluorescence microscope light source apparatus according to the present invention, the phosphor may preferably comprise Ce:LuAG or Ce:YAG.

The band-elimination filter may preferably be disposed on the light path of the illumination fluorescence between the phosphor and the light guide body.

According to the present invention, there is provided a fluorescence microscope including an illumination light bandpass filter and the above-described fluorescence microscope light source apparatus. A sample is illuminated with light, out of illumination fluorescence from the fluorescence microscope light source apparatus, having transmitted through the illumination light bandpass filter.

Advantageous Effects of Invention

The fluorescence microscope light source apparatus according to the present invention includes the phosphor that converts the excitation light emitted by the laser diode into the illumination fluorescence with the wavelength region of 500 to 550 nm, and thus can emit high-luminance light in a wavelength of 500 to 550 nm. Furthermore, the band-elimination filter that blocks or attenuates light, out of the illumination fluorescence, in the wavelength region including the transmission maximum wavelength and including no transmission minimum wavelength in the illumination light bandpass filter is provided on the light path of the illumination fluorescence. Consequently, a wavelength region in which a sensitive spectrum and the fluorescence spectrum of a fluorescent dye overlap with each other is small, thus reducing the background noise when the sample is observed.

DESCRIPTION OF EMBODIMENTS

A fluorescence microscope light source apparatus (hereinafter referred to simply as a "light source apparatus") according to an embodiment of the present invention will now be described below.

Figure 1:
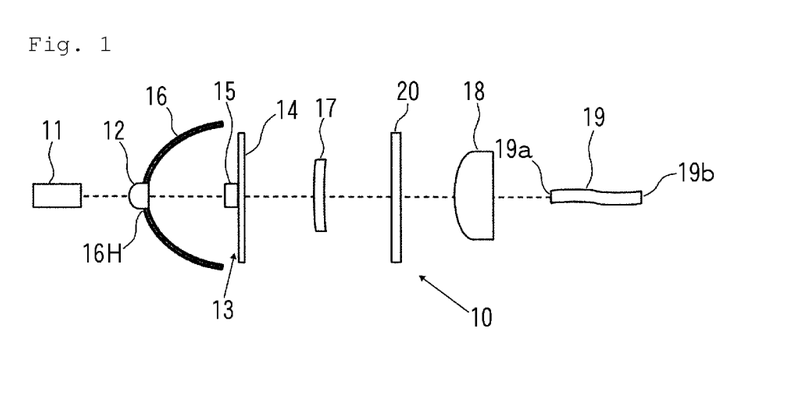
FIG. 1 is an explanatory diagram illustrating an exemplary configuration of a fluorescence microscope light source apparatus according to the present invention.

FIG. 1 is an explanatory diagram illustrating an exemplary configuration of a light source apparatus according to the present invention. A light source apparatus 10 shown in FIG. 1 is installed in a fluorescence microscope. Here, the fluorescence microscope includes an illumination light bandpass filter, and is configured to illuminate a sample with light with a wavelength of 500 to 550 nm having transmitted through the illumination light bandpass filter, and to observe observation fluorescence emitted by the sample.

The light source apparatus 10 includes a laser diode 11 that emits blue light as excitation light. A wavelength conversion member 13 is disposed in front of (the right side in FIG. 1) the laser diode 11 so as to face the laser diode 11. The wavelength conversion member 13 includes a plate-shaped phosphor 15 that converts the excitation light emitted by the laser diode 11 into illumination fluorescence, and a heat dissipation substrate 14 that dissipates heat generated in the phosphor 15. The plate-shaped phosphor 15 is disposed on the heat-dissipation substrate 14.

A reflector 16 that reflects the illumination fluorescence is provided between the laser diode 11 and the wavelength conversion member 13 as an optical system for extracting the illumination fluorescence emitted by the phosphor 15. More specifically, the reflector 16 is formed by a concave mirror having a through hole 16H at the bottom thereof. The reflector 16 is disposed so that its focal point is positioned on the phosphor 15 and the through hole 16H is positioned on a light path of the excitation light from the laser diode 11.

Moreover, a first condenser lens 12 that condenses the excitation light from the laser diode 11 onto the phosphor 15 is provided in the through hole 16H of the reflector 16.

A fiber-shaped light guide body 19 having an incidence end face 19a on which the illumination fluorescence from the reflector 16 is incident and an exit end face 19b from which the illumination fluorescence exits is provided in front of the reflector 16 (behind the wavelength conversion member 13). A second condenser lens 18 that condenses the illumination fluorescence from the reflector 16 onto the incident end face 19a of the light guide body 19 is disposed between the reflector 16 and the light guide body 19. Furthermore, a lens 17 is disposed between the reflector 16 and the second condenser lens 18.

In the light source apparatus 10 according to the present invention, a band-elimination filter 20 that blocks or attenuates light in a wavelength region including a transmission maximum wavelength and including no transmission minimum wavelength in the illumination light bandpass filter is provided on the light path of the illumination fluorescence. In this illustrated example, the band-elimination filter 20 is disposed between the lens 17 and the second condenser lens 18.

The laser diode 11 emits blue light with a wavelength of 440 to 470 nm, for example. As examples of the laser diode 11, may be mentioned those including an active layer formed from a nitrogen compound semiconductor, such as GaN or InGaN.

The phosphor 15 in the wavelength conversion member 13 emits fluorescence with a wavelength region of 500 to 550 nm by the excitation light from the laser diode 11. The phosphor 15 may be formed from a fluorescent crystal or may be formed by binding fluorescent crystal powder with a binder.

It is preferable that LuAG doped with a rare-earth element, such as Ce: LuAG ($Lu_3Al_5O_{12}$), or YAG doped with a rare-earth element, such as Ce:YAG ($Y_3Al_5O_{12}$), for example, is used as the fluorescent crystal. In these fluorescent crystals, the doped amount of the rare-earth element is about 0.5 mol %, for example.

When the phosphor 15 formed by binding fluorescent crystal powder with a binder is used, the average particle size of the fluorescent crystal powder is 1 to 60 μm, for example. The ratio of the fluorescent crystal powder in the phosphor 15 is 30 to 70 vol %, for example. As examples of the binder, may be mentioned an inorganic binder such as glass and an organic binder such as a silicone resin.

The band-elimination filter 20 blocks or attenuates light, out of the illumination fluorescence from the phosphor 15, in the wavelength region including the transmission maximum wavelength and including no transmission minimum wavelength in the illumination light bandpass filter. The wavelength region of light to be blocked or attenuated in the band-elimination filter 20 (hereinafter referred to as an "eliminated wavelength region") is set in accordance with a type of the fluorescent crystal constituting the phosphor 15, the transmission wavelength region of the illumination light bandpass filter installed in the fluorescence microscope or the like.

In such a band-elimination filter 20, the value of $\lambda Tmax - \lambda Smin$ is preferably not lower than 3 nm, more preferably not lower than 5 nm, wherein $\lambda Tmax$ is the transmission maximum wavelength in the illumination light bandpass filter and λSmin is the minimum wavelength in the eliminated wavelength region in the band-elimination filter 20.

Moreover, the value of λSmin−λTmin is preferably not lower than 20 nm, more preferably not lower than 28 nm, wherein λTmin is the transmission minimum wavelength in the illumination light bandpass filter.

Each of the transmission maximum wavelength and the transmission minimum wavelength in the illumination light bandpass filter herein is a wavelength corresponding to 95% of the maximum transmittance.

Each of the maximum wavelength and the minimum wavelength in the eliminated wavelength region in the band-elimination filter 20 is a wavelength corresponding to 95% of the maximum shielding rate.

In the band-elimination filter 20, transmittance of light in the eliminated wavelength region is preferably not more than 1%. When the transmittance of such light is more than 1%, background noise during the observation of a sample notably increases.

Moreover, in the band-elimination filter 20, transmittance of light in a wavelength region other than the eliminated wavelength region and in an excitation wavelength region of a fluorescent dye in a sample is preferably not lower than 95%. When the transmittance of such light is more than 95%, it may be difficult to emit high-luminance light in a wavelength of 500 to 550 nm.

As an example of such a band-elimination filter 20, may be mentioned a filter in which a dielectric multi-layer film, including alternately-layered high-refractive index layers and low-refractive index layers with a refractive index lower than that of the high-refractive index layer, is provided on a surface or both surfaces of a transparent substrate.

As examples of a material for making the transparent substrate, may be mentioned an optical glass such as an alkali-free glass, a borosilicate glass, a quartz glass, crystal, BK7 (trade name) and Tempax (trade name), a crystalline material such as sapphire, a transparent oxide semiconductor and a synthetic resin.

As the materials for making the high-refractive index layer and the low-refractive index layer in the dielectric multi-layer film, at least two of materials selected from the group consisting of TiO, $TiO_2$, $Y_2O_3$, $Ta_2O_5$, ZrO, $ZrO_2$, Si, $SiO_2$, $HfO_2$, Ge, $Nb_2O_5$, $Nb_2O_6$, $CeO_2$, $CeF_3$, ZnS, ZnO, $Fe_2O_3$, $MgF_2$, $AlF_3$, $CaF_2$, LiF, $Na_3AlF_6$, $Na_5Al_3F_{14}$, $Al_2O_3$, MgO, LaF, $PbF_2$ and $NdF_3$ may be selectively used.

As examples of a method for forming the dielectric multi-layer film, may be mentioned physical vapor deposition (PVD) methods, such as vacuum deposition, sputtering and ion plating. More specifically, resistance heating deposition, electron beam (EB) heating deposition, high-frequency heating deposition, laser beam heating deposition, ionized sputtering, ion beam sputtering, plasma sputtering, ion assisted sputtering, radical assisted sputtering or the like may be used.

Figure 2:
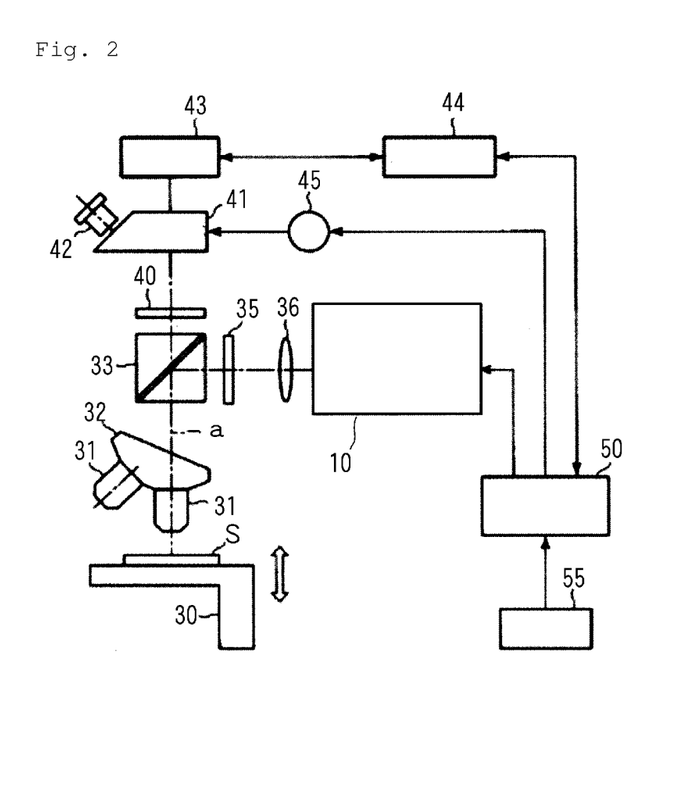
FIG. 2 is an explanatory diagram illustrating an exemplary configuration of a fluorescence microscope including the fluorescence microscope light source apparatus according to the present invention.

FIG. 2 is an explanatory diagram illustrating an exemplary configuration of a fluorescence microscope including the light source apparatus according to the present invention.

The fluorescence microscope includes a stage 30 on which a sample S is placed horizontally. The stage 30 is provided so as to be displaceable vertically. A plurality of objective lenses 31 having magnifications different from each other are disposed above the stage 30 so as to be capable of being close to the sample S. These objective lenses 31 are held by a revolver 32. The objective lenses 31 are selectively positioned on a light path a of observation fluorescence from the sample S by operating the revolver 32. A dichroic mirror 33 that transmits the observation fluorescence from the sample S and reflects the illumination fluorescence from the light source apparatus 10 is disposed above the objective lens 31 in such a manner that an optical functional surface thereof is tilted at 45° with respect to the light path a of the observation fluorescence.

The light source apparatus shown in FIG. 1 is disposed lateral to the dichroic mirror 33 via an illumination light bandpass filter 35 and a collimator lens 36. The illumination light bandpass filter 35 transmits light in the excitation wavelength region of a fluorescent dye labeled in the sample S and blocks or attenuates light in the other wavelength region. The collimator lens 36 changes the illumination fluorescence from the light source apparatus 10 into parallel light.

An eyepiece lens 42 and a CCD camera 43 are provided above the dichroic mirror 33 via an observation light bandpass filter 40 and a light path switch 41. The CCD camera 43 is connected to a camera controller 44 for controlling the CCD camera 43.

The observation light bandpass filter 40 transmits the observation fluorescence from the sample S and blocks or attenuates light in the other wavelength region. The light path switch 41 has a first light path from a light incident portion thereof to the eyepiece lens 42 and a second light path from the light incident portion to the CCD camera 43. Further included is a light path switching motor 45 that can cause the light path switch 41 to switch the light path of the observation fluorescence from the sample S between the first light path and the second light path.

The light source apparatus 10, the light path switching motor 45 and the camera controller 44 are connected to a central controller 50. An operation unit 55 is connected to the central controller 50. The operation unit 55 is provided with various types of operation switches used for an observer to operate the fluorescence microscope. Operating these operation switches enables the turning on and off of the light source apparatus 10, the switching of the light path in the light path switch 41 and photographing by the CCD camera 43.

Figure 3:
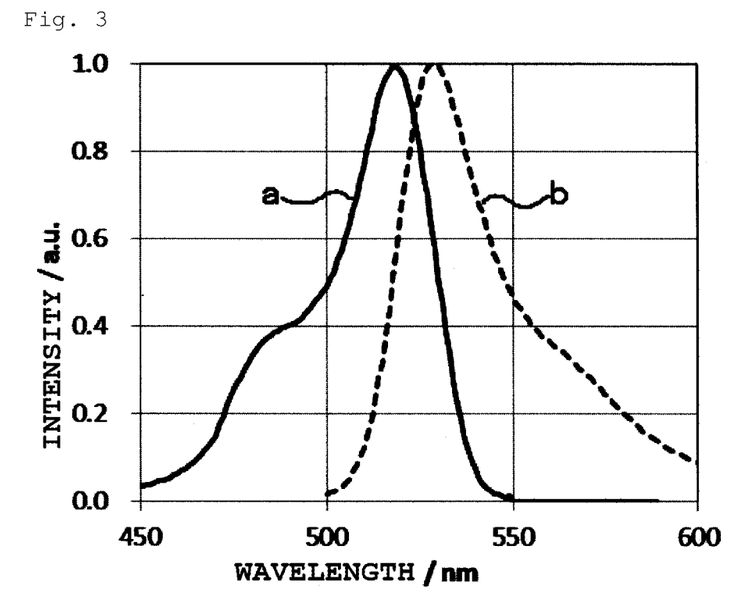
FIG. 3 is a chart showing exemplary distributions of an excitation wavelength region and a fluorescence wavelength region for a fluorescent dye labeled in a sample.

In the above-described fluorescence microscope, the sample S labeled with a fluorescent dye is first placed on the stage 30. Exemplary distributions of an excitation wavelength region and a fluorescence wavelength region for the fluorescent dye labeled in the sample S are shown in FIG. 3. In FIG. 3, "a" represents a distribution curve of the excitation wavelength region of the fluorescent dye, and "b" represents a distribution curve of the fluorescence wavelength region of the fluorescent dye. The fluorescent dye in this example is YFP (yellow fluorescent protein). The excitation wavelength region of this fluorescent dye is 450 to 530 nm, and the fluorescence wavelength region thereof is 500 to 600 nm.

Figure 4:
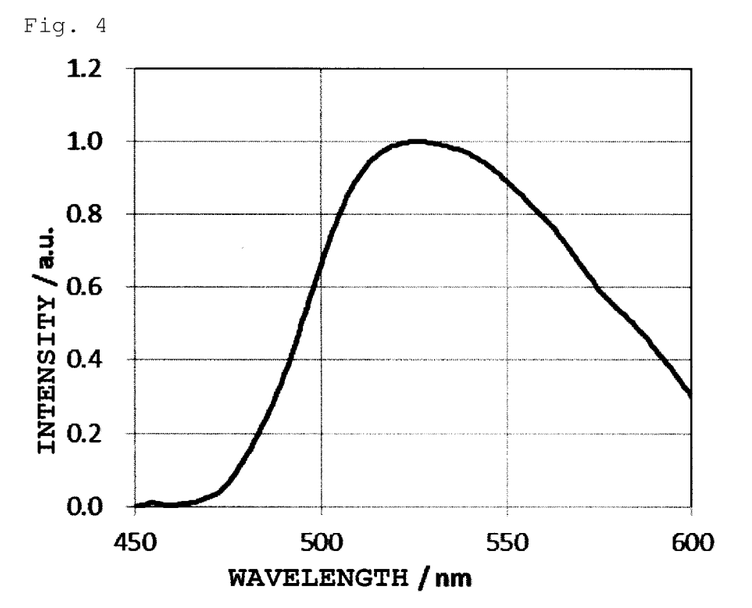
FIG. 4 is a chart showing an exemplary optical spectrum of fluorescence emitted by a phosphor.

When the laser diode 11 in the light source apparatus 10 is actuated by operating the operation unit 55, the excitation light from the laser diode 11 is condensed by the first condenser lens 12 and irradiated onto the phosphor 15. Consequently, the illumination fluorescence with the wavelength region of 500 to 550 nm is emitted from the phosphor 15. An exemplary optical spectrum of the illumination fluorescence emitted by the phosphor 15 is shown in FIG. 4. The phosphor 15 in this example is formed from Ce:LuAG.

Figure 5:
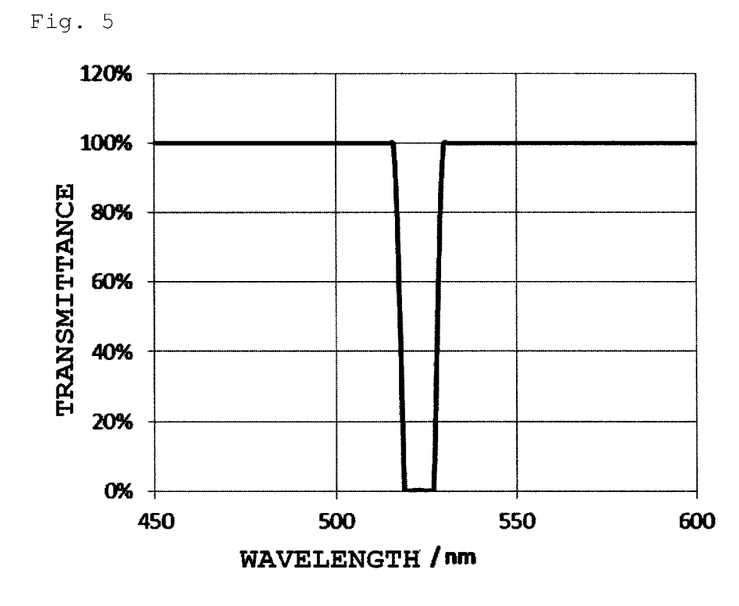
FIG. 5 is a chart showing an exemplary spectral transmittance curve of a band-elimination filter.
Figure 6:
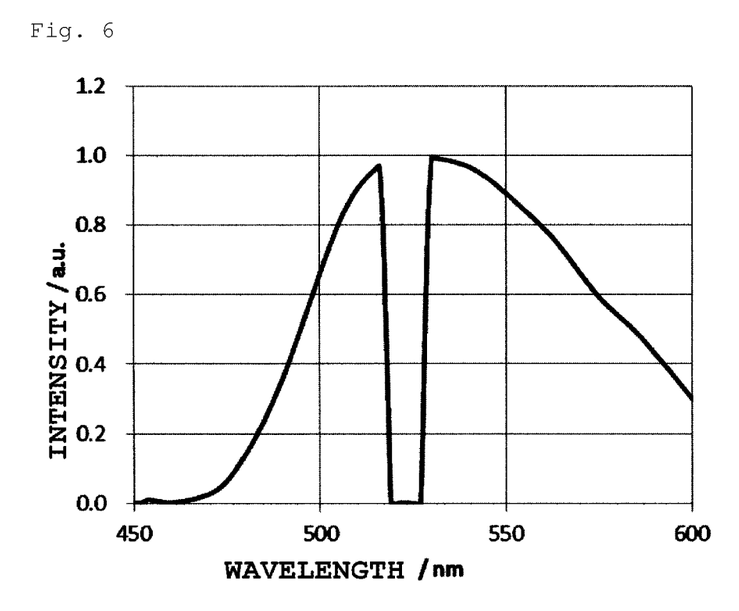
FIG. 6 is a chart showing an exemplary optical spectrum of transmitted light, i.e., fluorescence from the phosphor having transmitted through the band-elimination filter.

The illumination fluorescence from the phosphor 15 is reflected by the reflector 16 and then incident on the band-elimination filter 20 via the lens 17. Consequently, light, out of the illumination fluorescence from the phosphor 15, in a particular wavelength region is blocked or attenuated. An exemplary spectral transmittance curve of the band-elimination filter 20 is shown in FIG. 5. An exemplary optical spectrum of transmitted light, i.e., the illumination fluorescence from the phosphor 15 having transmitted through the band-elimination filter 20, is shown in FIG. 6. The band-elimination filter 20 in this example blocks or attenuates light in a wavelength region of 519 to 527 nm. The transmittance of light in the eliminated wavelength region is not more than 1%. As shown in FIG. 6, in the illumination fluorescence having transmitted through the band-elimination filter 20, light in a wavelength region in which the wavelength region of the illumination fluorescence from the phosphor 15 and the wavelength region of the observation fluorescence from the sample S overlap with each other is eliminated.

The illumination fluorescence having transmitted through the band-elimination filter 20 is condensed by the second condenser lens 18, enters the light guide body 19 through the incident end face 19a thereof and exits from the exit end face 19b of the light guide body 19.

Figure 7:
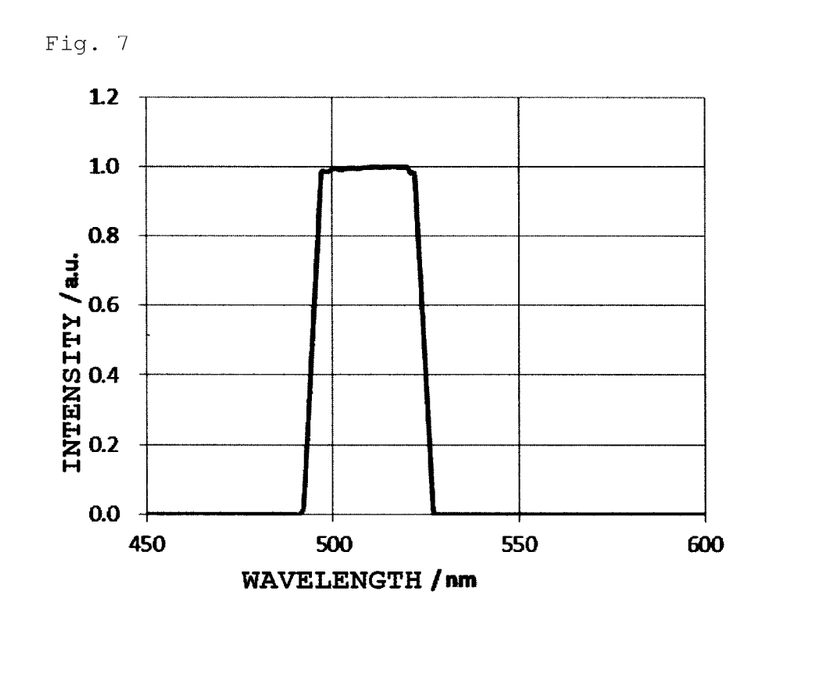
FIG. 7 is a chart showing an exemplary spectral transmittance curve of an illumination light bandpass filter.
Figure 8:
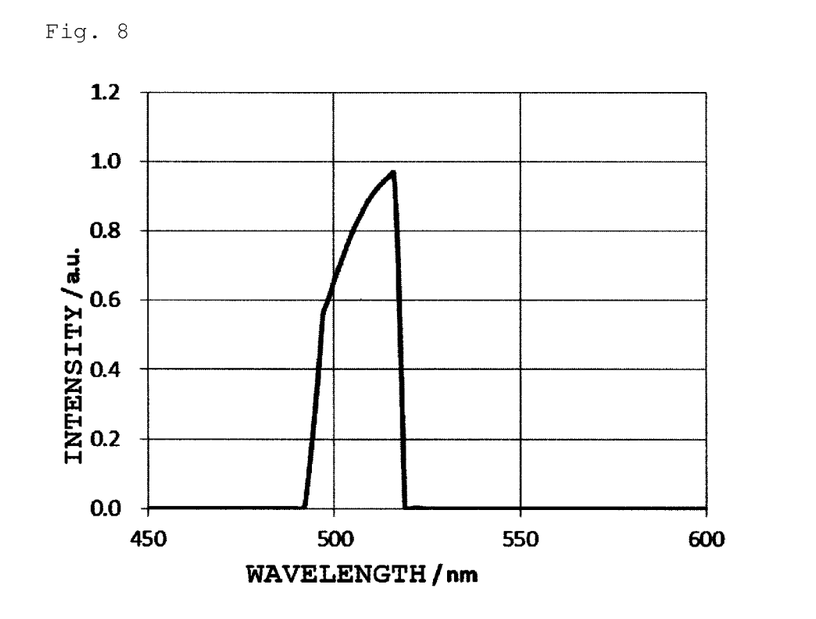
FIG. 8 is a chart showing an exemplary optical spectrum of transmitted light, i.e., illumination fluorescence from the fluorescence microscope light source apparatus according to the present invention having transmitted through the illumination light bandpass filter.

The illumination fluorescence having exited from the exit end face 19b of the light guide body 19 in the light source apparatus 10 is changed into parallel light by the collimator lens 36 and then incident onto the illumination light bandpass filter 35. Consequently, light, out of the illumination fluorescence from the light source apparatus 10, in a particular wavelength region transmits through the illumination light bandpass filter 35 and light in the other wavelength region is blocked or attenuated. An exemplary spectral transmittance curve of the illumination light bandpass filter 35 is shown in FIG. 7. An exemplary optical spectrum of transmitted light, i.e., the illumination fluorescence from the light source apparatus 10 having transmitted through the illumination light bandpass filter 35, is shown in FIG. 8. The illumination light bandpass filter 35 in this example transmits light in a wavelength region having a central wavelength of 510 nm and a passband width (a wavelength width lower than OD4) of 24 nm (a full width at half maximum of 29 nm), and blocks or attenuates light in the other wavelength region.

The illumination fluorescence having transmitted through the illumination light bandpass filter 35 is reflected in a downward direction by the dichroic mirror 33 and then irradiated onto the sample S placed on the stage 30 via the objective lens 31. Consequently, the fluorescent dye labeled in the sample S is excited and observation fluorescence is thus emitted from the fluorescent dye. The observation fluorescence from the sample S is incident on the light path switch 41 via the objective lens 31, the dichroic mirror 33 and the observation light bandpass filter 40. An image by the observation fluorescence from the sample S is observed by the observer via the eyepiece lens 42 or photographed by the CCD camera 43, by operating the light path switch 41.

The light source apparatus 10 according to the present invention includes the phosphor that converts the excitation light emitted by the laser diode 11 into the illumination fluorescence with the wavelength region of 500 to 550 nm. This enables the emission of high-luminance light in a wavelength of 500 to 550 nm. Furthermore, the band-elimination filter 20 that blocks or attenuates light, out of the illumination fluorescence, in the wavelength region including the transmission maximum wavelength and including no transmission minimum wavelength in the illumination light bandpass filter 35 is provided on the light path of the illumination fluorescence, thus resulting in a small wavelength region in which a sensitive spectrum and the fluorescence spectrum of the fluorescent dye overlap with each other. Consequently, background noise when the sample S is observed is small.

The present invention is not limited to the above-described embodiment, and various modifications as described below may be made thereto.

Figure 9:
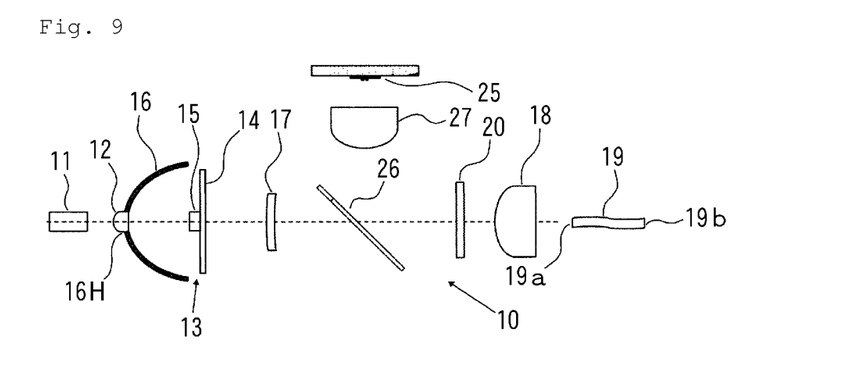
FIG. 9 is an explanatory diagram illustrating another exemplary configuration of the fluorescence microscope light source apparatus according to the present invention.

(1) As shown in FIG. 9, a light source apparatus 10 may include a light-emitting diode 25 that emits blue light or red light, for example. More specifically, in the light source apparatus 10 shown in FIG. 9, a dichroic mirror 26 that transmits illumination fluorescence from a phosphor 15 and reflects light from the light-emitting diode 25 is provided between a lens 17 and a band-elimination filter 20. The light-emitting diode 25 is provided above the dichroic mirror 26 via a lens 27.

While the single light-emitting diode 25 is provided in the example shown in FIG. 9, two light-emitting diodes, in particular, a light-emitting diode for emitting blue light and a light-emitting diode for emitting red light may be provided.

With such a light source apparatus 10, a sample labeled with a fluorescent dye that emits fluorescence by being excited by blue light or red light, or a sample labeled with a plurality of fluorescent dyes that emit fluorescence by being excited by light with different wavelengths can also be observed.

Figure 10:
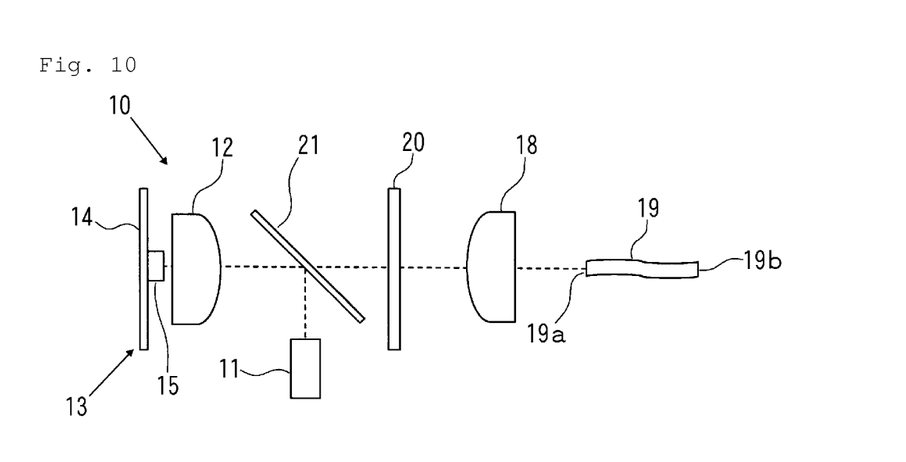
FIG. 10 is an explanatory diagram illustrating still another exemplary configuration of the fluorescence microscope light source apparatus according to the present invention.

(2) In a light source apparatus, a dichroic mirror 21 that reflects excitation light from a laser diode 11 and transmits illumination fluorescence from a phosphor 15 may be employed in place of the reflector 16 as an optical system for extracting the illumination fluorescence emitted by the phosphor 15 as shown in FIG. 10. More specifically, in the light source apparatus shown in FIG. 10, a wavelength conversion member 13 is disposed in such a manner that the phosphor 15 faces a band-elimination filter 20. The dichroic mirror 21 is disposed between the wavelength conversion member 13 and the band-elimination filter 20. The laser diode 11 is provided below the dichroic mirror 21. A first condenser lens 12 that condenses the excitation light from the laser diode 11 onto the phosphor 15 is provided between the dichroic mirror 21 and the wavelength conversion member 13.

(3) The configuration of a fluorescence microscope excluding the light source apparatus 10 is not limited to that shown in FIG. 2. Configurations of various fluorescence microscopes may be adopted.

REFERENCE SIGNS LIST 10 light source apparatus
11 laser diode
12 first condenser lens
13 wavelength conversion member
14 heat-dissipation substrate
15 phosphor
16 reflector
16H through hole
17 lens
18 second condenser lens
19 light guide body
19a incidence end face
19b exit end face
20 band-elimination filter
21 dichroic mirror
25 light-emitting diode
26 dichroic mirror
27 lens
30 stage 31 objective lens
32 revolver
33 dichroic mirror
35 illumination light bandpass filter
36 collimator lens
40 observation light bandpass filter
41 light path switch
42 eyepiece lens
43 CCD camera
44 camera controller
45 light path switching motor
50 central controller
55 operation unit
a light path of observation fluorescence
S sample

The invention claimed is:

1. A fluorescence microscope light source apparatus to be installed in a fluorescence microscope which includes an illumination light bandpass filter and in which a sample is illuminated with light with a wavelength of 500 to 550 nm having transmitted through the illumination light bandpass filter, the fluorescence microscope light source apparatus comprising:
   a laser diode configured to emit blue light as excitation light;
   a phosphor configured to convert the excitation light emitted by the laser diode into illumination fluorescence with a wavelength region of 500 to 550 nm;
   an optical system configured to extract the illumination fluorescence emitted by the phosphor;
   a first condenser lens configured to condense the excitation light onto the phosphor;
   a light guide body having one end face on which the illumination fluorescence is incident and the other end face from which the illumination fluorescence exits;
   a second condenser lens configured to condense the illumination fluorescence onto the one end face of the light guide body; and
   a band-elimination filter configured to block or attenuate light, out of the illumination fluorescence, in a wavelength region including a transmission maximum wavelength and including no transmission minimum wavelength in the illumination light bandpass filter, the band-elimination filter being provided on a light path of the illumination fluorescence.

2. The fluorescence microscope light source apparatus according to claim 1, wherein the phosphor comprises any one of Ce:LuAG and Ce:YAG.

3. The fluorescence microscope light source apparatus according to claim 1, wherein the band-elimination filter is disposed on the light path of the illumination fluorescence between the phosphor and the light guide body.

4. A fluorescence microscope comprising:
   an illumination light bandpass filter; and
   the fluorescence microscope light source apparatus according to claim 1, wherein
   a sample is illuminated with light, out of illumination fluorescence from the fluorescence microscope light source apparatus, having transmitted through the illumination light bandpass filter.

* * * * *